Figure 1:
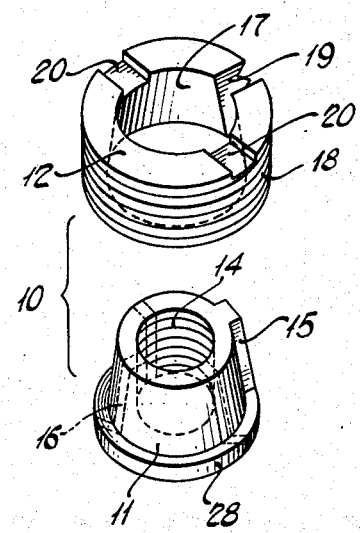

Nov. 6, 1945.  F. LE B. LORD  2,388,272
INTERNAL LOCK NUT
Filed Oct. 3, 1944

INVENTOR
FRANCIS LeBARRON LORD.
BY
ATTORNEY

Patented Nov. 6, 1945

2,388,272

UNITED STATES PATENT OFFICE 2,388,272

INTERNAL LOCK NUT

Francis Le Barron Lord, Bloomfield, N. J., assignor to Titelox Manufacturing Company, Montclair, N. J., a corporation of New Jersey Application October 3, 1944, Serial No. 556,982

2 Claims. (Cl. 151—19)

This invention relates to locking devices, such as internal lock nuts and the like. It is the object of this invention to provide an internal lock nut unit adapted to be readily assembled in a manner which will seal the parts together to preclude their accidental displacement due to vibration or other extraneous forces, and, at the same time, will permit them to be disengaged when so desired, without damage to the parts.

An embodiment of a structure employing my invention is shown in the accompanying drawing and described in detail in the ensuing specification. This embodiment is merely by way of example and my invention is not limited thereto but includes all other forms which would come within the scope of the appended claims.

In the drawing,

Fig. 1 is a disassembled, perspective view of the internal lock nut unit of my invention, comprising an internal and external member.

Figure 2:
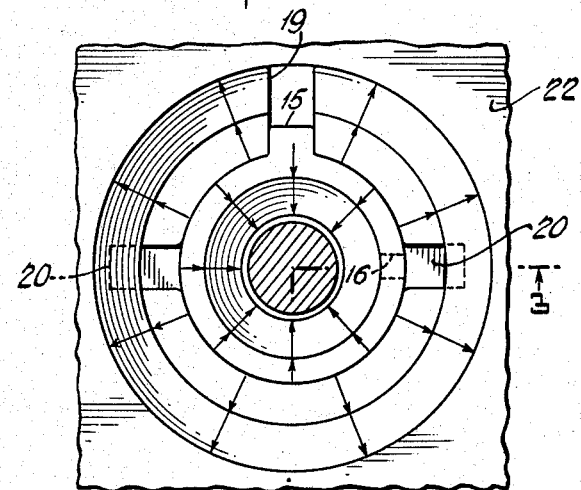
Figure 3:
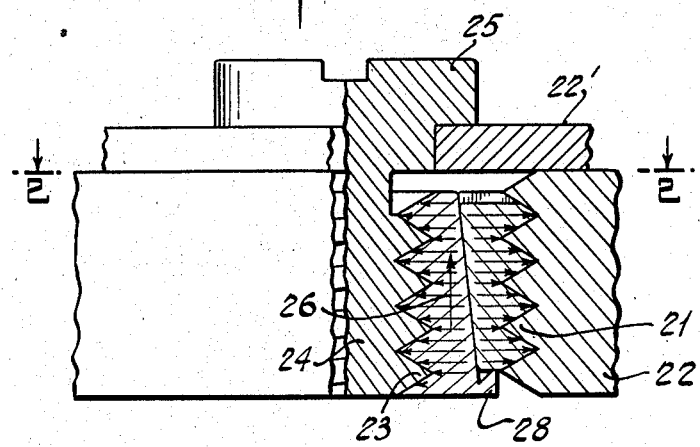
Figure 4:
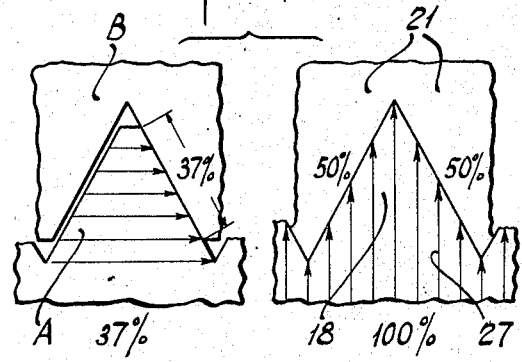

Fig. 2 is a horizontal plan view thereof, partly sectional, taken on line 2—2 of Fig. 3, showing the internal lock nut unit in assembled relation, Fig. 3 is a vertical, partly sectional, partly fragmentary, view taken on line 3—3 of Fig. 2, in the direction of the arrows, and Fig. 4 graphically illustrates the comparative effectiveness of the internal lock nut unit of my invention relative to standard thread engaging members.

In the embodiment of the invention shown in Fig. 1 of the drawing, the internal lock nut unit 10 comprises an internal member 11 adapted to be received within an external member 12. The internal member 11 is externally tapered and is internally apertured and threaded as at 14 and is provided with an external key 15 and with an axial slit 16. The external member 12 is provided with an internal tapered aperture 17 and is externally threaded as at 18 and provided with an axial slit 19 and with transverse recesses 20—20 at the upper end thereof, or the like, to facilitate initially threading the external member into the threads 21 defining the aperture of object 22 to be engaged by the internal lock nut unit of my invention for the purpose of holding another object 22' thereto or for analogous purpose.

In operation, the internal member 11 is partly inserted into the end of the aperture 17 of greater diameter, with key 15 received within the slit 19 of external member 12, the slit 19 being, in the disassembled form of the parts shown in Fig. 1, wider than key 15.

The other relative dimension of the parts are such that the internal member 11 can initially be partly inserted into the external member 12 as described.

The bolt 24 or other threaded member to engage the internal lock nut unit of my invention is threaded into the threaded aperture 14 of the internal member 11 until the head 25 of member 24 abuts the object 22'. Continued rotation of the head 25 of the member 24 will cause further threading of the internal member so that the internal member 11 will be progressively further advanced into the external member 12 against the resistance offered by virtue of the fact that the internal member 11 is being advanced toward the tapered end of the aperture 17 of smaller diameter. The internal member 11 advances into the external member 12 in the threading operation described in the general direction indicated by the arrow 26 (Fig. 3) in the longitudinal axis of the internal lock nut unit 10. The internal member 11 is simultaneously moved laterally at right angles to the plane axis indicated by the arrow 26, into positive pressure contact with the threads 23 of the member 24 and the external member 12 is expanded at right angles to arrow 26 and into pressure contact with threaded aperture 21. It is thus possible to obtain a high degree of efficiency in the transmission of energy exerted in the rotating of the member 24 to the interengaging of threads 14 and 23. This is attained by virtue of the fact that the force exerted on the threaded portion 14 of the internal member 11 will be the product of the movement of the member 11 on the general longitudinal axis thereof indicated by the arrow 26 multiplied by its movement at a plane at right angles thereto generally designated by the arrows 27 and into contact with threads 23 and simultaneous expansion of external member 12 as above described.

The internal member 11 may be provided at its lower end with a peripheral flange 28 adapted to abut the external member when the parts are fully engaged as in Fig. 3 to provide a stop preventing excessive engagement of the parts and excessive expansion of the external member 12 in the object 22, which may be of a comparatively soft plastic, metal or other material. For this purpose, the peripheral flange may also have an upwardly pointed edge as indicated in Fig. 3. The external member under pressure could not rotate; it merely expands, in the assembly operation.

The key 15 is located at a predetermined circumferential point relative to the slit 16 (one of the many possible locations of the slit 16 being indicated in dotted lines in Fig. 2 and three possible locations for slit 16 being indicated in dotted lines in Fig. 1) of the internal member 11 so that one may obtain a predetermined wrapping effect to resist disengagement of the parts generally corresponding to the effect of wrapping a loop about a rod wherein more than half of the loop is wrapped on the rod when desired. If the key 15 is located diametrically opposite the slit 16 (which would be at a point substantially 180° from the slit 16) then the keying of member 11 in the external member 12 would be substantially at a neutral point so that no wrapping effect would be attained. By selecting a circumferential point at which the key 15 is located relative to the slit 16 other than 180°, one may predetermine the wrapping effect to be attained and the tendency of the parts to resist disengagement and to form a tightening or loosening tendency after assembly. The slit 16 of the internal member 11 permits the internal member 11 to be tightly compressed on the threaded portion 23 of the member 24 and the slit 19 of external member 12 permits the latter to expand into threads 21 so that all surfaces of the engaging threads will be pressure bound together and in contact. This feature is graphically illustrated in Fig. 4, indicating that the oppositely inclined planar surfaces of the threads 18 and 21 (the same applying equally to threads 14 and 23) have this binding, contacting effect, resulting in a 100% pressure engagement of the threads, whereas in the engagement of the threaded member A, which may be the conventional nut, with a second threaded member B, which may be the conventional bolt, only part of one series of parallel planar surfaces of the threads engage with part of the adjacent parallel series of planar surfaces of the threads. In recognition of this fact, it has been customary to flatten the crests of the threads of members A and B as shown in Fig. 4 so that the effectively engaging surfaces of the conventional threaded bolt and nut is only 37% as against the 100% threaded engagement in the use of the internal lock nut unit of my invention.

On assembly of the parts as shown in Fig. 3, the threads 18 and 21, 14 and 23 will be fully engaged as described above so as to provide an effective seal and the parts will automatically tend to resist displacement due to vibration or other extraneous forces. To disengage the parts, the head 25 of member 24 is rotated in a reverse direction to that used in the assembly of the parts. After rotating the member 24 for part of a revolution, it may be tapped downwardly in a direction reverse to that of the arrow 26; this action will shift the internal member in the aperture 17, breaking the taper seal so that further rotation of the member 24 to disengage the parts may be had with comparative ease. The means for axially keying the internal member 11 in the external member 12 may comprise a means equivalent to the key 15 and slit 19 within the purview of this invention.

Definitions: The term "predetermined wrapping effect" as used in the specification and claims hereof shall be deemed to mean the location of the slit 16 relative to the keying means so that on engagement or disengagement of the members a wrapping effect is attained where the slit is located other than 180° from the keying means and where the slit is located at 180° from the keying means the wrapping effect is nil—in short, the term shall be deemed to mean predetermining whether and if so the degree of the wrapping effect to be attained by the relative location of the parts referred to. The parts may be made of any desirable or suitable material and the dimensions thereof may be varied to suit the requirements of the use to which the same are to be put, the representation in the drawing being solely for the sake of illustrating one embodiment of the invention.

Having thus described my invention, what I claim as new and desire to secure by Letters Patent is:

1. An internal lock nut comprising an externally threaded member for threaded engagement with a threaded aperture, said member being provided with an axial slit and having an internal tapered aperture, and an internal member externally complementarily tapered and adapted to be inserted into the aperture of said first named member, said internal member being internally threaded for engagement by a threaded member and being provided with an axial slit and with an external key adapted to be received in the slit of said first mentioned member to key the internal member therein for axial reciprocation therein, said key being so disposed relative to the slit of the first mentioned member as to provide a predetermined wrapping effect when the parts are assembled and engage a threaded member.

2. An internal lock nut comprising an externally threaded member for threaded engagement with a threaded aperture, said member being provided with an axial slit and having an internal tapered aperture, and an internal member externally complementarily tapered adapted to be inserted into the aperture of said first named member, said internal member being internally threaded for engagement by a threaded member and being provided with an axial slit and with an external key adapted to be received in the slit of said first mentioned member to key the internal member therein for axial reciprocation therein, and being further provided with a flanged head at the lower end thereof, said key being so disposed relative to the slit as to provide a predetermined wrapping effect when the parts are assembled and engage a threaded member.

F. LE BARRON LORD.